United States Patent
Li et al.

(10) Patent No.: US 10,984,311 B2
(45) Date of Patent: Apr. 20, 2021

(54) INVOLVED GENERATIVE MACHINE LEARNING MODELS FOR FUNCTIONAL TESTING

(71) Applicant: Robert Bosch GmbH, Stuttgart (DE)

(72) Inventors: Nanxiang Li, San Mateo, CA (US); Bilal Alsallakh, Sunnyvale, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 16/287,579

(22) Filed: Feb. 27, 2019

(65) Prior Publication Data
US 2020/0272887 A1   Aug. 27, 2020

(51) Int. Cl.
| | | |
|---|---|---|
| G06N 3/04 | (2006.01) | |
| G06N 3/08 | (2006.01) | |
| G06K 9/00 | (2006.01) | |
| G06K 9/62 | (2006.01) | |
| G06N 5/04 | (2006.01) | |
| G06K 9/20 | (2006.01) | |

(52) U.S. Cl.
CPC ....... *G06N 3/0454* (2013.01); *G06K 9/00664* (2013.01); *G06K 9/2081* (2013.01); *G06K 9/6253* (2013.01); *G06K 9/6256* (2013.01); *G06K 9/6263* (2013.01); *G06N 3/088* (2013.01); *G06N 5/04* (2013.01); *G06K 9/00791* (2013.01)

(58) Field of Classification Search
CPC ........ G06N 3/0454; G06N 3/088; G06N 5/04; G06K 9/6263; G06K 9/6253; G06K 9/2081; G06K 9/6256; G06K 9/00664; G06K 9/00791
See application file for complete search history.

(56) References Cited

U.S. PATENT DOCUMENTS

| | | | |
|---|---|---|---|
| 10,373,055 B1* | 8/2019 | Matthey-de-l'Endroit | G06N 3/0454 |
| 2018/0225812 A1* | 8/2018 | Diverdi | G06K 9/4628 |
| 2019/0294961 A1* | 9/2019 | Zuev | G06K 9/6255 |

FOREIGN PATENT DOCUMENTS

WO   2019011968 A1   1/2019

OTHER PUBLICATIONS

Szabó, Attila, et al. "Challenges in disentangling independent factors of variation." arXiv preprint arXiv:1711.02245 (2017). (Year: 2017).*

(Continued)

*Primary Examiner* — Geoffrey E Summers
(74) *Attorney, Agent, or Firm* — Brooks Kushman P.C.

(57) ABSTRACT

A system includes a display device, a memory configured to store a visual analysis application and image data including a plurality of images including detectable objects; and a processor, operatively connected to the memory and the display device. The processor is configured to execute the visual analysis application to learn generative factors from objects detected in the plurality of images, visualize the generative factors in a user interface provided to the display device, receive grouped combinations of the generative factors and values to apply to the generative factors to control object features, create generated objects by applying the values of the generative factors to the objects detected in the plurality of images, combine the generated objects into the original images to create generated images, and apply a discriminator to the generated images to reject unrealistic images.

20 Claims, 6 Drawing Sheets

(56) References Cited

OTHER PUBLICATIONS

DeVries, Terrance, and Graham W. Taylor. "Dataset augmentation in feature space." arXiv preprint arXiv:1702.05538 (2017). (Year: 2017).*

Jha, Ananya Harsh, et al. "Disentangling factors of variation with cycle-consistent variational auto-encoders." European Conference on Computer Vision. Springer, Cham, 2018. (Year: 2018).*

Liu, Xiaofeng, et al. "Data augmentation via latent space interpolation for image classification." 2018 24th International Conference on Pattern Recognition (ICPR). IEEE, 2018. (Year: 2018).*

Mathieu, Michael F., et al. "Disentangling factors of variation in deep representation using adversarial training." Advances in neural information processing systems 29 (2016): 5040-5048. (Year: 2016).*

Higgins et al., β-VAE: Learning Basic Visual Concepts With a Constrained Variational Framework, International Conference on Learning Representations, Toulon, France, Apr. 24-26, 2017.

Amini et al., Variational Autoencoder for End-to-End Control of Autonomous Driving with Novelty Detection and Training Debiasing, Massachusetts Institute of Technology, Oct. 2018.

Ding et al., A New Multi-Vehicle Trajectory Generator to Simulate Vehicle-to-Vehicle Encounters, arXiv:1809.05680v4 [cs.CV], Feb. 14, 2019.

* cited by examiner

INVOLVED GENERATIVE MACHINE LEARNING MODELS FOR FUNCTIONAL TESTING

TECHNICAL FIELD

The present disclosure relates to involved generative machine learning models for functional testing.

BACKGROUND

Autonomous driving research aims to build safe and reliable systems that operate beyond their original design environment. This is because a complete interpretation of the environment is not possible at design time. Most of the current systems perform well within only a limited set of situations. Beyond these situations, the performance is potentially unknown and unpredictable. Ensuring that the artificial intelligence (AI) system will make reasonable decisions in all situations becomes a critical task.

Deep neural networks (DNN) are one of the most widely deployed machine learning models nowadays due to its superior performance in many challenging tasks such as object recognition in images, event detection from audio signals, machine translation, and so on. The ability of DNNs to learn and generalize beyond training data makes it particularly suited to open context systems. In fact, deep learning enables computers to learn tasks that seemed to be intractable for computer programs before.

However, this approach still faces challenges. For example, its generalization is limited to the training data scope. As a result, the behavior of large-scale black-box deep learning models is still unpredictable for rare events or unseen cases. As another challenge, deep learning models are susceptible to crafted perturbations called adversarial examples that, when added to natural examples, lead deep neural network models to make wrong predictions.

SUMMARY

In one or more illustrative examples, a system includes a display device, a memory configured to store a visual analysis application and image data, including a plurality of images including detectable objects; and a processor, operatively connected to the memory and the display device. The processor is configured to execute the visual analysis application to learn generative factors from objects detected in the plurality of images, visualize the generative factors in a user interface provided to the display device, receive grouped combinations of the generative factors and values to apply to the generative factors to control object features, create generated objects by applying the values of the generative factors to the objects detected in the plurality of images, combine the generated objects into the original images to create generated images, and apply a discriminator to the generated images to reject unrealistic images.

In one or more illustrative examples, a method includes learning generative factors from objects detected in a plurality of images; visualizing the generative factors in a user interface provided to a display device; receiving grouped combinations of the generative factors and values to apply to the generative factors to control object features; creating generated objects by applying the values of the generative factors to the objects detected in the plurality of images; combining the generated objects into the original images to create generated images; and applying a discriminator to the generated images to reject unrealistic images In one or more illustrative examples, non-transitory computer-readable medium comprising instructions of visual analysis application that, when executed by one or more processors, cause the one or more processors to perform disentangled representation learning with a Variational Auto-Encoder (VAE) to learn generative factors from objects detected in a plurality of images; visualize the generative factors in a user interface provided to a display device; receive grouped combinations of the generative factors and values to apply to the generative factors to control object features; create generated objects by applying the values of the generative factors to the objects detected in the plurality of images; combine the generated objects into the original images to create generated images; and apply a discriminator to the generated images to reject unrealistic images

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Autonomous driving involves vehicles traversing open environments that are hard to control. With recent developments in AI systems, identifying how AI models behave in rare and previously-unseen environments plays an important role in ensuring safe and reliable autonomous driving. Identifying how the model will perform requires an ability to test the model on a broad set of test cases, beyond the ones available in the training data. AI techniques may be leveraged in generative machine learning to address these issues.

To address these challenges, synthetic road scene images may be used to test AI models without experiencing it in the real-world. With minimum user interaction, realistic images may be systematically generated that improve data coverage of the AI model and reveal weakness and corner cases in the model. A visual analytic solution may be used to steer data generation of such images.

Disentangled representation learning may be used with a Variational Auto-Encoder (VAE) to automatically discover generative factors for road objects. These generative factors may allow the objects to be changed in appearance based on particular settings applied to the factors. In a traffic light example, the generative factors may include color, orientation, background contrast, symbol, and so on. With the learned VAE, existing traffic lights in real-world images may be modified to change from a green light to a red light, from a circle light to an arrow indication, and so on.

These generated images may be generated and used to test the AI model. Thus, the generated images may be used to understand performance of the object detector in a more comprehensive and principled way. Continuing with the traffic light example, if the detector does not perform well for traffic lights with arrow signs, then the modified image may reveal this weakness by observing the missed detection as compared to the originally-detected traffic lights. While many examples herein relate to the modeling of traffic lights in images, it should be noted that the techniques being described herein are also useful for other applications in which additional images may be useful to identify weaknesses in AI models or to improve the training or operation of AI models.

Figure 1:
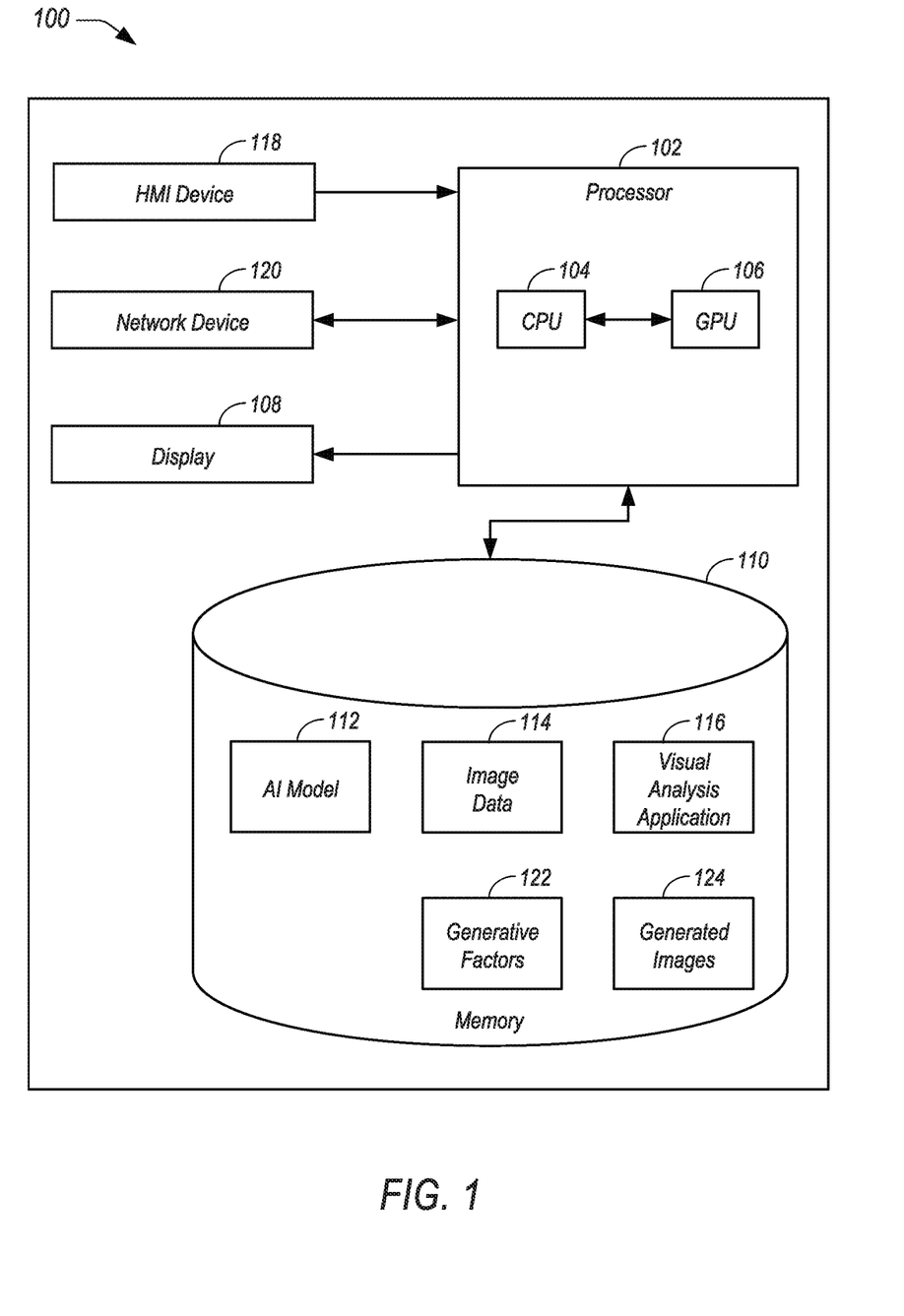
FIG. 1 is a schematic diagram of an exemplary embodiment of a system for using generative machine learning models to systematically generate realistic images to improve data coverage of an AI model for functional testing.

FIG. 1 is a schematic diagram of an exemplary embodiment of a system 100 for using generative machine learning models to systematically generate realistic images to improve data coverage of an AI model for functional testing. The system 100 includes a processor 102 that is operatively connected to a memory 110, human-machine interface (HMI) device 118, and a display device 108. As is described in more detail below, during operation, the system 100 (i) learns generative factors 122 based on the image data 114, (ii) visualizes the generative factors 122, (iii) groups combinations of the generative factors 122 to control image features, (iv) creates generated objects based on application of the grouped combinations of the generative factors 122, (v) combines the generated objects into the original scene of the image data 114 to create generated images 124, and (vi) applies a discriminator to ensure the realism of the generated images 124. Once completed, these additional images may be used with the AI model 112 to improve test coverage of the AI model 112 and/or improve the training of the AI model 112.

In the system 100, the processor 102 includes one or more integrated circuits that implement the functionality of a central processing unit (CPU) 104 and graphics processing unit (GPU) 106. In some examples, the processor 102 is a system on a chip (SoC) that integrates the functionality of the CPU 104 and GPU 106, and optionally other components including, for example, the memory 110, a network device, and a positioning system, into a single integrated device. In other examples the CPU 104 and GPU 106 are connected to each other via a peripheral connection device such as PCI express or another suitable peripheral data connection. In one example, the CPU 104 is a commercially available central processing device that implements an instruction set such as one of the x86, ARM, Power, or MIPS instruction set families.

The GPU 106 may include hardware and software for display of at least two-dimensional (2D) and optionally three-dimensional (3D) graphics to a display device 108. The display device 108 may include an electronic display screen, projector, printer, or any other suitable device that reproduces a graphical display. In some examples, processor 102 executes software programs including drivers and other software instructions using the hardware functionality in the GPU 106 to accelerate generation and display of the graphical depictions of models of human movement and visualizations of quantitative computations that are described herein During operation, the CPU 104 and GPU 106 execute stored program instructions that are retrieved from the memory 110. The stored program instructions include software that controls the operation of the CPU 104 and the GPU 106 to perform the operations described herein. The display device 108 may include an electronic display screen, projector, printer, or any other suitable device that reproduces a graphical display that is generated via the CPU 104 and GPU 106.

While FIG. 1 depicts the processor 102 as including both the CPU 104 and GPU 106, alternative embodiments may omit the GPU 106, for example the processor 102 may be of a server that generates output visualization data using only a CPU 104 and transmits the output visualization data to a remote client computing device that uses a GPU 106 and a display device 108 to display the data. Additionally, alternative embodiments of the processor 102 can include microcontrollers, application specific integrated circuits (ASICs), field programmable gate arrays (FPGAs), digital signal processors (DSPs), or any other suitable digital logic devices in addition to or as replacements for the CPU 104 and GPU 106.

In the system 100, the memory 110 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data, including an AI model 112, image data 114, and a visual analysis application 116, during operation of the system 100. In some embodiments, the CPU 104 and the GPU 106 each have access to separate RAM devices (e.g., a variant of DDR SDRAM for the CPU 104 and a variant of GDDR, HBM, or other RAM for the GPU 106) while in other embodiments the CPU 104 and GPU 106 access a shared memory device. The memory 110 may store the AI model 112, image data 114, and visual analysis application 116 for maintenance and retrieval. The memory 110 may also store generative factors 122 and generated images 124.

The human-machine interface (HMI) device 118 may include any of various devices that enable the system 100 to receive control input. Examples of suitable input devices include human interface inputs such as keyboards, mice, touchscreens, voice input devices, and the like.

A network device 120 may include any of various devices that enable the system 100 to receive the AI model 112, image data 114, and/or visual analysis application 116. Examples of suitable network devices 120 include a network adapter or peripheral interconnection device that receives data from another computer or external data storage device, which can be useful for receiving large sets of image data 114 in an efficient manner.

In AI systems, model-based reasoning refers to an inference method that operates based on an AI model 112 of the physical world. Generally, the AI model 112 is trained to learn a function that provides a precise correlation between input values and output values. At runtime, an AI engine uses the knowledge encoded in the AI model against observed data to derive conclusions such as a diagnosis or a prediction. Accordingly, a main focus of AI application development is developing the AI model 112. To do so, the AI model 112 needs to be trained based on as complete as possible of a set of input data.

The image data 114 refers to a plurality of records that are each representative of an image of the physical world. In many examples herein, the image data 114 includes two-dimensional images captured by camera devices and maintained in various computer-based image formats. In some instances, some or all of the image data 114 may be received from a data storage device. The image data 114 may include images that may be used as input to train the AI model 112. The image data 114 may also include images that may be used as input to be identified by the AI model 112 to determine the behavior of the AI model 112.

Notably, identifying how the AI model 112 will perform requires an ability to test the AI model 112 on a broad set of test cases, beyond the ones available in the training data. To address limitations in the image data 114 not including varied enough samples of real-world situations, synthetic images may be used to test AI models 112 without experiencing it in the real-world. With minimum user interaction, realistic images may be systematically generated that improve data coverage of the AI model 112 and reveal weakness and corner cases in the AI model 112.

The visual analysis application 116 includes instructions that, when executed by the processor 102 of the system 100, cause the system 100 to perform the processes and operations described herein with respect to the systematic generation of generated images 124 from the image data 114. These processes and operations include to (i) learn generative factors 122 based on the image data 114, (ii) visualize the generative factors 122, (iii) group combinations of the generative factors 122 to control image features, (iv) create generated objects based on application of the grouped combinations of the generative factors 122, (v) combine the generated objects into the original scene of the image data 114 to create generated images 124, and (vi) apply a discriminator to ensure the realism of the generated images 124. Once completed, these additional images may be used with the AI model 112 to improve test coverage of the AI model 112 and improve the training of the AI model 112.

The visual analysis application 116 may utilize disentangled representation learning with a VAE to automatically discover the generative factors 122 for road objects. The generative factors 122 relate to independent characteristics of an object being analyzed. In an example of a traffic light, these generative factors 122 may relate to aspects such as the color of the traffic light (red, yellow, green, etc.), the shape or symbol of the illuminated portion of the traffic light (e.g., circle, triangle, arrow, etc.), background contrast of the traffic light to its surroundings, the rotation of the traffic light, and so on.

These generative factors 122 allow the objects to be changed in appearance based on particular value settings applied to the generative factors 122. For a traffic light as an example, with the learned VAE, the visual analysis application 116 may be used to modify existing traffic lights detected in real-world images of the image data 114 to change a traffic light in an image from a green light to red light, from a circle to an arrow, and so on. The results of the processing performed using the generative factors results in generated objects that may be reinserted into the original images to create generated images 124 that incorporate base features of the original image but with altered versions of detected objects perturbed using the inputs applied to the generative factors 122.

The generated images 124 can be used to understand the performance of the object detector of the AI model 112 in a more comprehensive and principled way. Continuing with the traffic light example, if the AI model 112 detector does not perform well for traffic lights with arrow signs, then the generated images 124 can reveal this weakness by observing the missed detection as compared to the detection of the images of the image data 114 without the modification.

After learning the generative factors 122, the visual analysis application 116 may be used to visualize what each generative factor 122 learns. This helps in the understanding of how the generative factors 122 change the generated images 124 independently. The visualization is done by applying the generative model to a large set of real objects, under different values for the generative factor, both negative and positive. Examining the generated images on both the negative and positive ends reveals what the generative factor 122 learns. Averaging the images on both of these ends gives a visual summary of the generative factor 122.

Additionally, the visual analysis application 116 may be used to visualize how the generative factors 122 modify images in combination. While each generative factor 122 controls a specific independent feature of the objects, the generative factors 122 in combination may result in different outcomes, some of which might result in unrealistic objects (e.g. a traffic light that is both red and green). By use of the visualization provided by the visual analysis application 116, the generative factors 122 may be narrowed down to relevant combinations to be used in the generation process.

The generated objects, as modified, may then be embedded in their original scenes after matching them with the image values at that region in the original image. This, accordingly, results in the generated images 124. Then, a discriminator trained to determine if the final result generated images 124 look realistic and undistinguishable from natural images may be applied to confirm the suitability of the generated images 124, thereby warranting realistic results.

While the illustrated system 100 is shown using a single computing device that incorporates the display device 108, other example systems 100 may include multiple computing devices. As one example, the processor 102 generates the generative factors 122 and transmits the generative factors 122 to a remote computing device using the network device 120 via a data network. The remote computing device then may display the user interface of the visual analysis application 116. In another nonlimiting example, the processor 102 is implemented in a server computing device that executes the visual analysis application 116 to implement a web server that transmits data to a web browser in a remote client computing device via a data network. The client computing device implements a web browser or other suitable image display software to display the data received from the server using a display device 108 of the client computing device.

Figure 2:
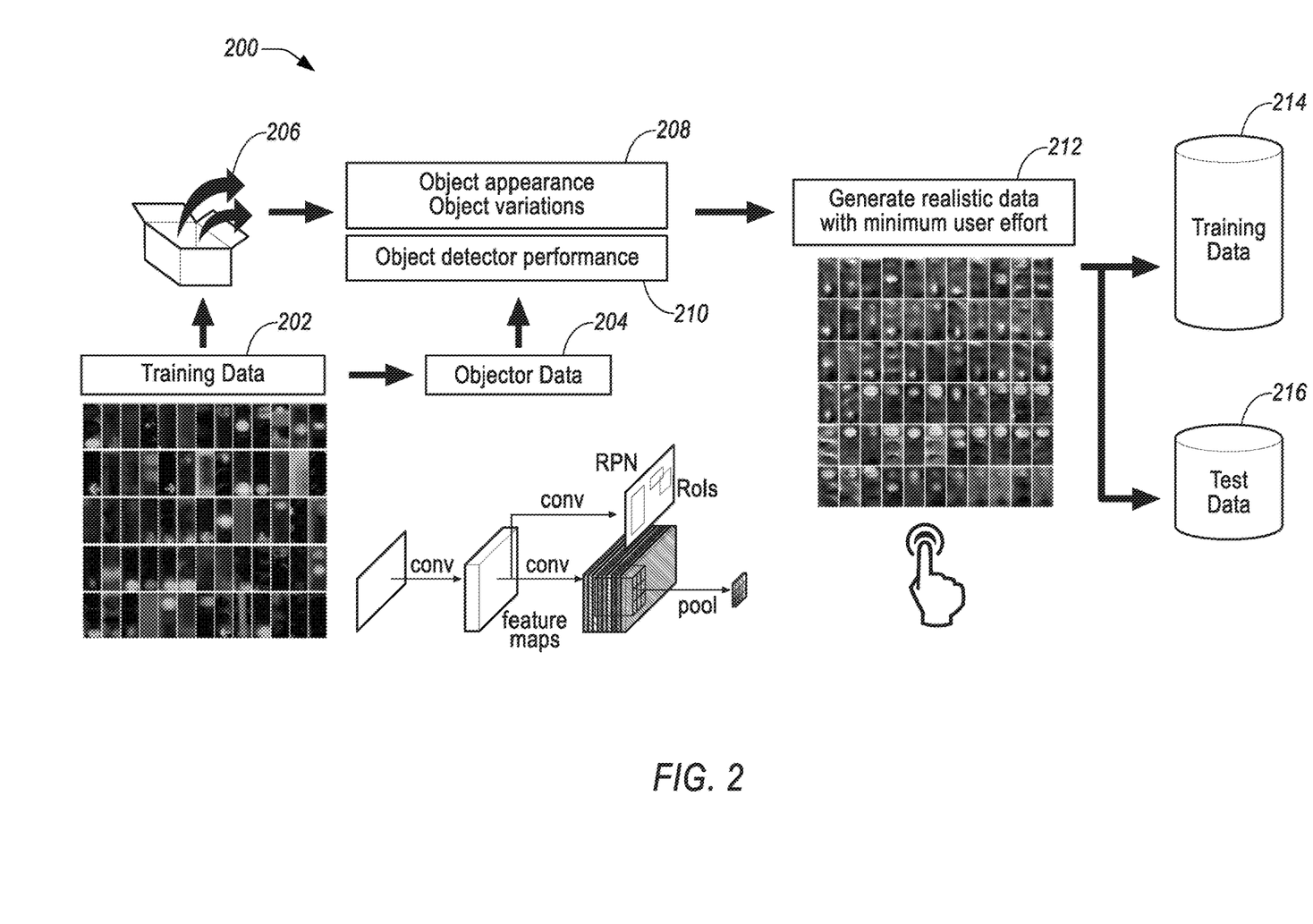
FIG. 2 is an example data flow illustrating the creation of generated images of traffic lights.

FIG. 2 is an example data flow 200 illustrating the creation of generated images 124 of traffic lights. As shown, training data 202, which may include a set of images of the image data 114, is applied to an object detector 204. In this example, the object detector 204 may include an AI model 112 having been taught to detect the locations of traffic lights within images. The training data 202 may also be applied to the VAE 206 to automatically discover the generative factors 122 for the objects detected by the object detector 204. This may result in object data 208, such as information regarding the appearances and variation of the object detected by the object detector 204 according to the generative factors 122. The object detector 204 may also provide object detector performance data 210 which may be used to analyze the success of the object detector 204 in identifying the objects in the training data 202.

Using the object data 208, at 212 the visual analysis application 116 provides a user interface from which realistic data may be generated. The result of the user of the user interface may include additional training data 214 which may be used to allow the AI model 112 to learn from additional situations, as well as test data 216 which may be used to determine the performance of the AI model 112 in the generated situations.

Figure 3:
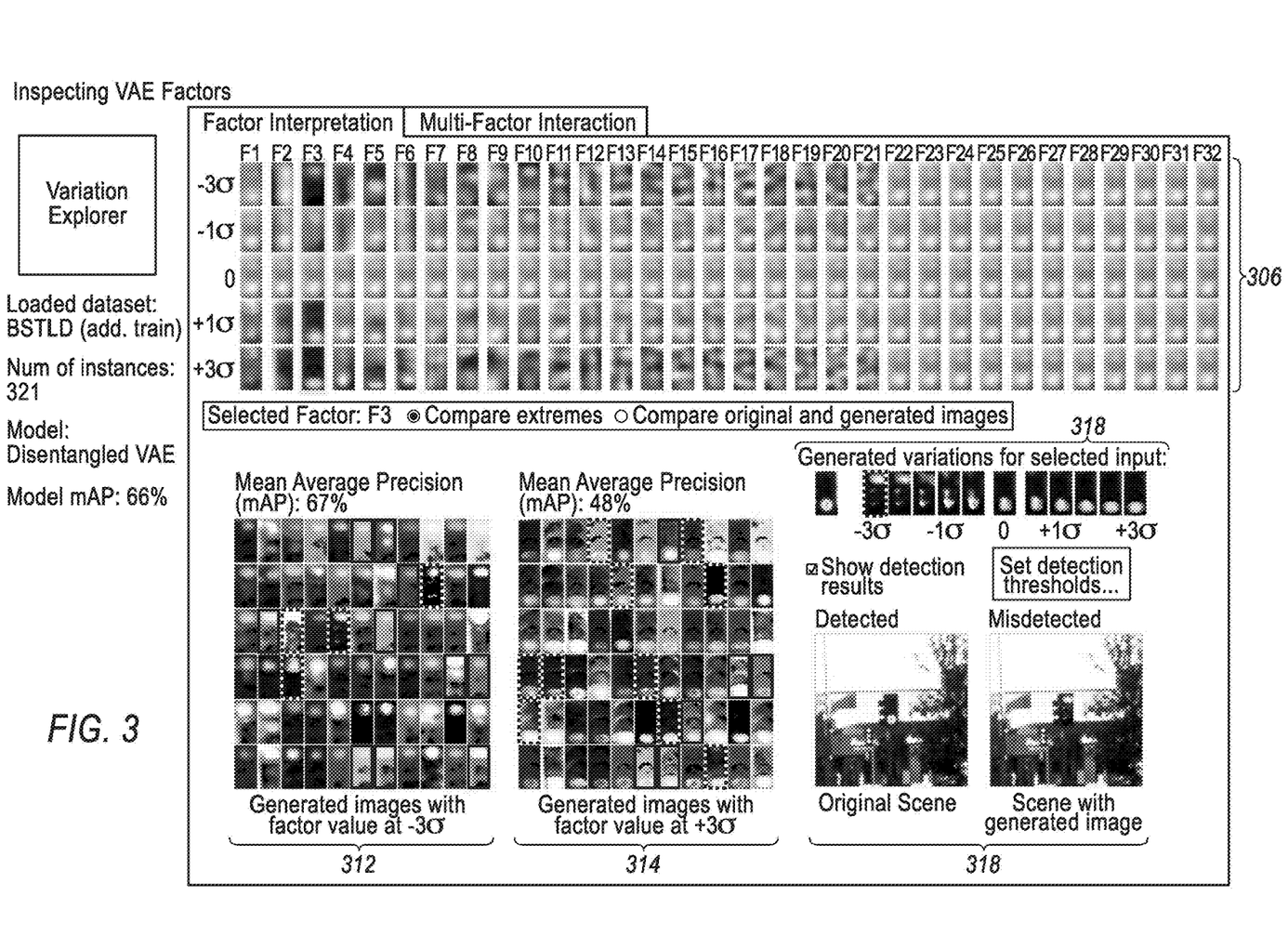
FIG. 3 is an example user interface of the visual analysis application for the interpretation of the generative factors.

FIG. 3 is an example user interface 300 of the visual analysis application 116 for the interpretation of the generative factors 122. This user interface 300 generally provides an overview of the learned generative factors 122, how each factor modifies detected objects, and how the results look in the final scene. In an example, the user interface 300 may be provided to the display device 108 by the processor 102 executing the visual analysis application 116.

As shown, the user interface 300 provides a visualization of the results of analysis of a set of image data 114. General aspects of the analysis may be illustrated in information controls 302. These aspects may include, as some examples, a name of the data set that was loaded (e.g., BSTLD (additional train)), a number of instances of objects in the data set (e.g., 321 instances), a model used to analyze the data set (e.g., Disentangled VAE), and a model mAP (e.g., 66%).

The user interface 300 may also include a factor tab control 304, from which the user interface 300 may be selected to display data regarding the specific generative factors 122 identified by the model (here a Disentangled VAE, but other algorithms may be used in other examples), or to display multi-factor interaction between the generative factors 122. As shown, individual factors are selected from the factor tab control 304. Therefore, the user interface 300 illustrates a factor display 306 of the individual generative factors 122. In this example, there are twenty-two generative factors 122 being displayed in the X-axis of the factor display 306. Each generative factor 122 may be displayed as an average image of the objects of the dataset, with a set of values along a scale of values for generative factor 122. As shown, five different values are shown for each generative factor 122 in the Y-axis of the factor display 306, from one extreme value, to a middle value, to the other extreme value of the generative factor 122 (e.g., $-3\sigma$, $-1\sigma$, 0, $1\sigma$, $3\sigma$). While five values are shown in the user interface 300, this is only an example and more, fewer, or different values may be used.

A generative factor 122 may be selected from the factor display 306. For instance, a factor may be selected by mouse or touch input to the factor display 306. As shown by a factor selection 308 in the factor display 306, the third factor F3 is selected for further analysis. Additionally, the selected generative factor 122 is indicated in a selection label 310.

Adjacent to the selection label 310 may be options with respect to the selected generative factor 122, for example to compare extremes of values of the selected generative factor 122 or to compare original and generated images. As shown, the option to compare the extremes of the values is selected. Accordingly, the user interface 300 illustrates a set of objects from the data set with the selected generative factor 122 perturbed from one extreme value to the other. For instance, a first set of generated images 312 are shown with a factor value of $-3\sigma$ at one extreme, and a second set of generated images 314 are shown with a factor value of $3\sigma$ at the one extreme. Mean average precision values (mAP) for each set of generated images 312, 314 are also provided in the user interface 300.

Additionally, for the selected generative factor 122, the user interface 300 may provide for details of the operation of the selected generative factor 122 on a specific object detected in one of the images of the data set. In one example, the image to be used may be selected by the user, while in other cases the images may be preselected in the user interface 300. As shown, the original image of the detected object in the images is shown in image 316, along with a range of generated images using the image for factor values from one extreme to the other. As can be seen, the original image is of a green traffic light, where the factor F3 at a first extreme values shows a red traffic light but at the other extreme value shows a green traffic light. Accordingly, the factor F3 may represent a factor for the red/green color of traffic light objects. By adjusting the value of the generative factor 122 for an object in the selected input image, the object may be altered from a green light to a red light. In other examples, a red traffic light may be altered into a green traffic light using the F3 generative factor 122.

Further, the user interface 300 may also include an option to allow for the display of detection results for the generated image. As shown at 318, the option to display detection results is selected, and example detection results are provided for both the original unaltered image including the detected object, as well as for the generated image including the object modified according to the selected generative factor 122. As can be seen in the user interface 300, the original scene including a green traffic signal was correctly detected by the AI model 112, while the modified scene with the generated image of the red traffic light was incorrectly detected by the AI model 112.

This information may be useful in identifying areas in which the AI model 112 could benefit from further training. For instance, if the AI model 112 is not good at detecting red lights (or in another example, green arrows in traffic lights), then additional image data may be generated to train the AI model to better detect those variations.

Figure 4:
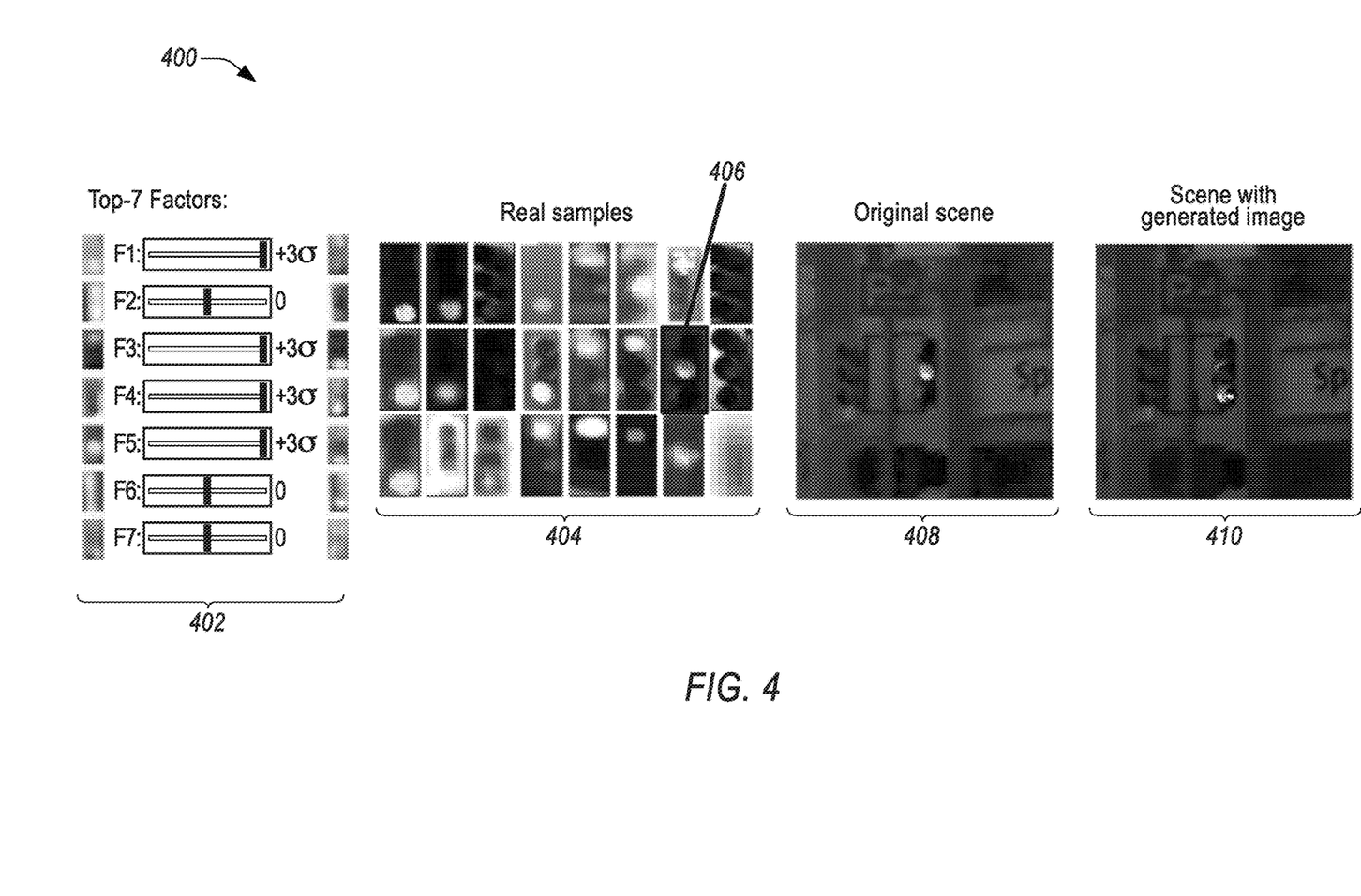
FIG. 4 is an example portion of a user interface of the visual analysis application for the manipulation of combinations of multiple generative factors.

FIG. 4 is an example portion of a user interface 400 of the visual analysis application 116 for the manipulation of combinations of multiple generative factors 122. The manipulation of the generative factors 122 in combination may be desirable, as some characteristic of the objects may require the adjustment of multiple generative factors 122 to make a clear and relevant change. As shown, user interface 400 shows an example of how different generative factors 122 can be combined to generate a traffic light with specific properties. For instance, a sample traffic light in yellow state is selected and modified into a green one with arrow using a combination of the generative factors 122. In an example, the user interface 400 may be provided to the display device 108 by the processor 102 executing the visual analysis application 116.

The user interface 400 may allow for the supervised combination of values set for a set of generative factors 122. For instance, one generative factor 122 may represent to make a traffic light more green, another generative factor 122 may represent to make a traffic light more of an arrow, and another generative factor 122 may allow for the adjustment of background vs. foreground coloration of the traffic light. As shown at 402, a set of seven generative factors 122 may be adjusted in combination to provide for greater control of the image generation. This specific set of seven generative factors 122 includes, in this example: F1 which captures traffic light shape (circle to arrow), F2 which captures right-side lighting/orientation; F3 which captures whether the traffic light has green vs red light on; F4 which captures whether the traffic light body is dark or bright; F5 which captures whether the orange light is on or off; F6 which captures left-side lighting/orientation; and F7 which captures chromatic shift along blue-orange dimension. As shown in the illustration at 402, the factors F1, F3, F4, and F5 are each set to one extreme value, while the factors F2, F6, and F7 are set to a middle value.

As shown at 404, the user interface 400 may include a set of real samples to be controlled using the selected values from the set of generative values at 402. The displayed samples at 404 may receive a user selection, such as a touch or mouse click. As shown by the selection 406, a yellow traffic light object has been selected for manipulation. At 408, the user interface 400 shows the selected yellow traffic light object in the context of the original image. At 410, the user interface 400 shows the selected traffic light object in the context of the original image, but with the object perturbed according to the generative factors 122 adjusted as shown at 402. Accordingly, it can be seen that the sample traffic light in yellow state has been modified in the scene into a green one with arrow using the aforementioned values set to the combination of the generative factors 122.

Figure 5:
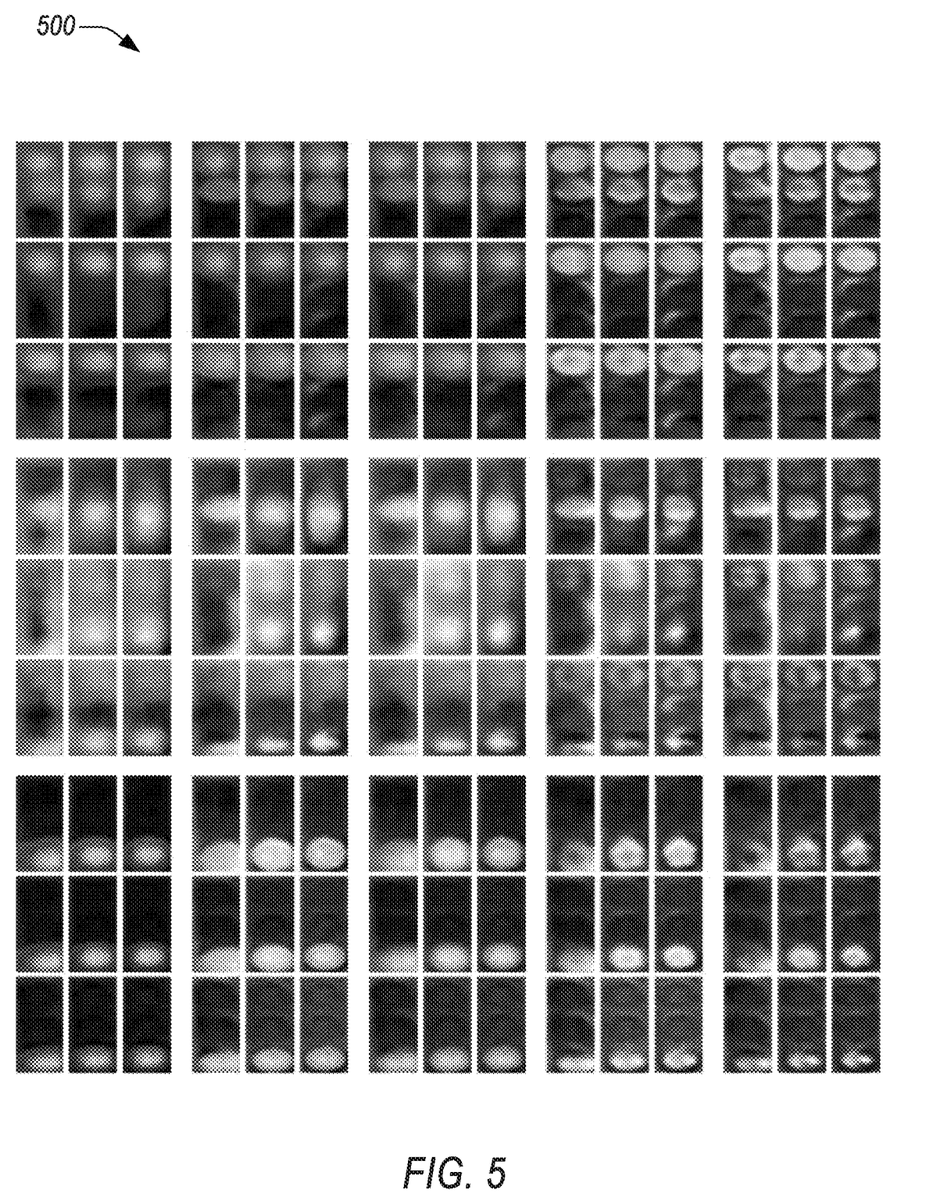
FIG. 5 in an example summary of generated combinations of four selected generative factors that control traffic light state, arrow shape, and body darkness.

FIG. 5 in an example summary 500 of generated combinations of four selected generative factors 122 that control traffic light state, arrow shape, and body darkness. While some combinations lead to very realistic results, some lead to unclear or semantically irrelevant combinations. The latter images may be excluded in the generation of final test cases. A discriminator may be used to selectively exclude the aberrant images. In one example, the discriminator may include a model trained to recognize valid features of objects, such as that only a single color of a traffic light is illuminated. In another example, the discriminator may include the receipt of user input.

Figure 6:
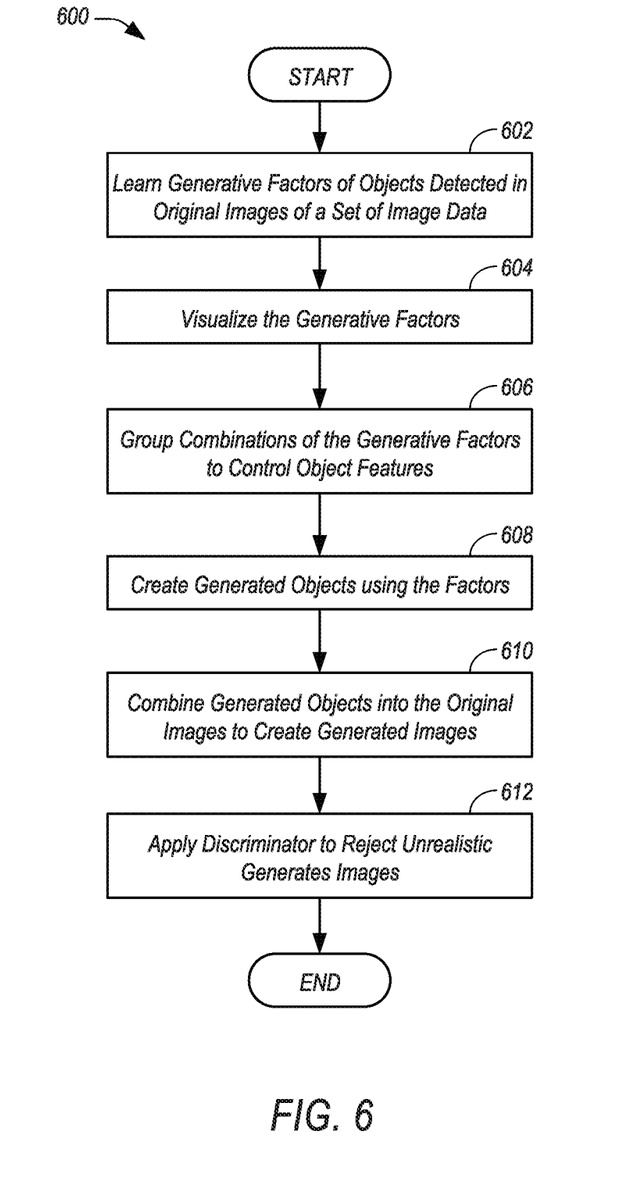
FIG. 6 is an illustration of an example process for using generative machine learning models to systematically generate realistic images.

FIG. 6 is an illustration of an example process 600 for using generative machine learning models to systematically generate realistic images. In an example, the process 600 may be performed by the system 100 as discussed in detail herein.

At operation 602, the processor 102 learns generative factors 122. In an example, and as shown in the example data flow 200, the processor 102 may execute the visual analysis application 116 to utilize disentangled representation learning with the VAE 206 to automatically discover the generative factors 122 from training data 202. The generative factors 122 may relate to independent characteristics of the object in the images that are analyzed.

The processor 102 visualizes the generative factors 122 at 604. In an example, the processor 102 may execute the visual analysis application 116 to provide an interface, such as the user interface 300, for the display of the learned generative factors 122. At 606, the processor 102 groups combinations of the generative factors 122 to control image features. In an example, the processor 102 may execute the visual analysis application 116 to provide an interface such as the user interface 400 for the grouping of the learned generative factors 122.

The processor 102 creates generated objects at operation 608. In an example, the processor 102 may utilize the visual analysis application 116 and the training data 202 to create the generated objects. Examples of generated objects are shown in the user interface 300, the user interface 400, and the example summary 500. At operation 610, the processor 102 combines the generated objects into the original scene of the object that was changed to create generated images 124. An example of combination of a generated object into the original scene is shown as the generated image 124 at 410 in the user interface 400. The generated images 124 may, accordingly, be used as additional training data 214 or as test data 216.

At 612, the processor 102 applies a discriminator to ensure the realism of the generated images 124. For instance, and as shown in the summary 500, the discriminator may include a model trained to recognize valid features of objects, such as that only a single color of a traffic light is illuminated. In another example, the discriminator may include user input. After operation 612, the process 600 ends.

In sum, disentangle representation learning with a VAE may be applied to automatically learn generative factors 122 of objects, such as objects on the road encountered by an autonomous vehicle. These generated road objects may be embedded with different variations into the scene images (e.g., road scene images) to test the AI models 112 and identify failure cases before experiencing them in the real world. With a minimum of user interaction, realistic images can be systematically generated that improve the data coverage and reveal AI model 112 weakness and corner cases.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
  a display device;
  a memory configured to store a visual analysis application and image data including a plurality of images that include detectable objects; and
  a processor, operatively connected to the memory and the display device, and configured to execute the visual analysis application to
    learn generative factors from objects detected in the plurality of images,
    visualize the generative factors in a user interface provided to the display device,
    receive grouped combinations of the generative factors and values to apply to the generative factors to control object features,
    create generated objects by applying the values of the generative factors to the objects detected in the plurality of images,
    combine the generated objects into the plurality of images to create generated images, and
    apply a discriminator to the generated images to reject unrealistic images.

2. The system of claim 1, wherein the processor is further configured to execute the visual analysis application to apply the generated images to an artificial intelligence (AI) model to determine whether the generated objects are correctly detected.

3. The system of claim 2, wherein the processor is further programmed to include, in the user interface, detection results using the AI model indicative of whether an object is correctly detected in one of the plurality of images and detection results using the AI model indicative of whether a generated object is correctly detected in one of the generated images.

4. The system of claim 1, wherein the processor is further programmed to utilize disentangled representation learning with a Variational Auto-Encoder (VAE) to learn the generative factors.

5. The system of claim 1, wherein the processor is further programmed to include, in the user interface, a factor display of the generative factors in which each generative factor is displayed as an average image of the detected objects, perturbed for each of a plurality of values along a scale of values for the respective generative factor.

6. The system of claim 1, wherein the processor is further programmed to include, in the user interface, for a selected factor, a set of generated images with a value of the selected factor at a first value and a second set of generated images with a value of the selected factor at a second value.

7. The system of claim 1, wherein the processor is further programmed to include, in the user interface, controls for adjustment of the values of the generative factors as a combination of a plurality of the generative factors.

8. The system of claim 1, wherein the processor is further programmed to include, in the user interface, an original image from the plurality of images including a detectable object, and a generated image including a generated object replacing the detectable object in the original image.

9. A method comprising:
  learning generative factors from objects detected in a plurality of images;
  visualizing the generative factors in a user interface provided to a display device;
  receiving grouped combinations of the generative factors and values to apply to the generative factors to control object features;
  creating generated objects by applying the values of the generative factors to the objects detected in the plurality of images;
  combining the generated objects into the plurality of images to create generated images; and
  applying a discriminator to the generated images to reject unrealistic images.

10. The method of claim 9, further comprising applying the generated images to an artificial intelligence (AI) model to determine whether the generated objects are correctly detected.

11. The method of claim 10, further comprising including, in the user interface, detection results using the AI model indicative of whether an object is correctly detected in one of the plurality of images and detection results using the AI model indicative of whether a generated object is correctly detected in one of the generated images.

12. The method of claim 9, further comprising utilizing disentangled representation learning with a Variational Auto-Encoder (VAE) to learn the generative factors.

13. The method of claim 9, further comprising including, in the user interface, a factor display of the generative factors in which each generative factor is displayed as an average image of the detected objects, perturbed for each of a plurality of values along a scale of values for the respective generative factor.

14. The method of claim 9, further comprising including, in the user interface, for a selected factor, a set of generated images with a value of the selected factor at a first value and a second set of generated images with a value of the selected factor at a second value.

15. The method of claim 9, further comprising including, in the user interface, controls for adjustment of the values of the generative factors as a combination of a plurality of the generative factors.

16. The method of claim 9, further comprising including, in the user interface, an original image from the plurality of images including a detectable object, and a generated image including a generated object replacing the detectable object in the original image.

17. A non-transitory computer-readable medium comprising instructions of visual analysis application that when executed by one or more processors, cause the one or more processors to:
  perform disentangled representation learning with a Variational Auto-Encoder (VAE) to learn generative factors from objects detected in a plurality of images;
  visualize the generative factors in a user interface provided to a display device;
  receive grouped combinations of the generative factors and values to apply to the generative factors to control object features;

create generated objects by applying the values of the generative factors to the objects detected in the plurality of images;

combine the generated objects into the plurality of images to create generated images; and apply a discriminator to the generated images to reject unrealistic images.

18. The medium of claim 17, further comprising instructions to cause the one or more processors to:

apply the generated images to an artificial intelligence (AI) model to determine whether the generated objects are correctly detected; and include, in the user interface, detection results using the AI model indicative of whether an object is correctly detected in one of the plurality of images and detection results using the AI model indicative of whether a generated object is a correctly detected in one of the generated images.

19. The medium of claim 17, further comprising instructions to cause the one or more processors to:

include, in the user interface, a factor display of the generative factors in which each generative factor is displayed as an average image of the detected objects, perturbed for each of a plurality of values along a scale of values for the respective generative factor; and include, in the user interface, for a selected factor from the factor display, a set of generated images with a value of the selected factor at a first value and a second set of generated images with a value of the selected factor at a second value.

20. The medium of claim 17, further comprising instructions to cause the one or more processors to:

include, in the user interface, controls for adjustment of the values of the generative factors as a combination of a plurality of the generative factors; and include, in the user interface, an original image from the plurality of images including a detectable object, and a generated image including a generated object replacing the detectable object in the original image.

* * * * *